(No Model.)

F. T. PEARCE & J. HOAGLAND.
BAR FOR WATCH CHAINS.

No. 284,887. Patented Sept. 11, 1883.

WITNESSES:
M. F. Bligh
C. H. Leuthy Jr.

INVENTOR:
F. T. Pearce & J. Hoagland
by Joseph A. Miller & Co.
atty's

UNITED STATES PATENT OFFICE.

FRANK T. PEARCE AND JOHN HOAGLAND, OF PROVIDENCE, R. I.

BAR FOR WATCH-CHAINS.

SPECIFICATION forming part of Letters Patent No. 284,887, dated September 11, 1883.

Application filed September 8, 1882. (No model.)

*To all whom it may concern:*

Be it known that we, FRANK T. PEARCE and JOHN HOAGLAND, both of the city and county of Providence, and State of Rhode Island, have invented a new and useful Improvement in Bars for Watch-Chains; and we hereby declare that the following is a full, clear, and exact description of the same, reference being had to the accompanying drawings, forming part of this specification.

This invention has reference to an improvement in the bars usually placed on the end of watch-chains; and it consists in the peculiar and novel construction of the same, by which a knife or button-hook, either or both, are inserted and held in the hollow bar, and may be inserted into the ends of the same for use, as will be more fully set forth hereinafter.

Figure 1:
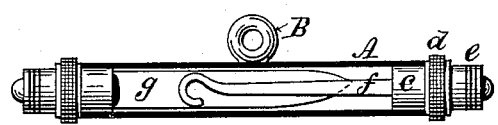
Figure 2:
Figure 3:
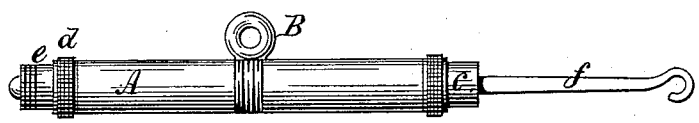

Figure 1 is a sectional view of our improved chain-bar, showing a knife and a button-hook inserted and concealed in the same. Fig 2 is a view of the improved chain-bar, showing the knife inserted into the end of the bar for use; and Fig. 3 is a view of the bar, showing the button-hook secured in the end of the bar for use.

In the drawings, A is the tubular bar. B is the ring by which the same is secured to the chain. *c* and *e* are the cylindrical portions of the end pieces, to which either the button-hook *f* or the knife-blade *g* is secured. *d* is a projecting knurled or otherwise ornamented shoulder, forming a bearing against the end of the tubular bar. The cylindrical portions *c* and *e* are made to fit tightly into the tubular bar, so that when inserted with the knife or button-hook inside or outside of the bar they will be firmly held. If desired, either or both may, however, be provided with what is known in the art as a "bayonet-joint," and the knife and button-hook, either or both, may be thus firmly secured. In either case the bar can be used as a handle for either the knife or button-hook, or both.

A chain-bar thus constructed forms a new and convenient article combining the ordinary uses of the chain-bar with a knife, useful for various purposes, and a glove-buttoner, and at the same time increasing the weight of the bar, so as to balance the chain when it is worn with the bar suspended.

Having thus described our invention, we claim as new and desire to secure by Letters Patent—

A chain-bar having a ring for the attachment of a suspending-link, said bar having a cylindrical perforation from end to end, combined with a piece which forms the handle of the hook or blade, said piece having cylindrical portions *c e*, adapted to fit the perforation in the bar, and an intermediate portion, *d*, of greater diameter, so that the bar serves as a handle or a sheath to the implement, substantially as set forth.

FRANK T. PEARCE.
JOHN HOAGLAND.

Witnesses:
M. F. BLIGH,
J. A. MILLER, Jr.